US012700141B2

(12) United States Patent
Graziosi et al.

(10) Patent No.: US 12,700,141 B2
(45) Date of Patent: Aug. 4, 2026

(54) V3C SYNTAX EXTENSION FOR MESH COMPRESSION USING SUB-PATCHES

(71) Applicants: SONY GROUP CORPORATION, Tokyo (JP); Sony Corporation of America, New York, NY (US)

(72) Inventors: Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 152 days.

(21) Appl. No.: 18/115,386

(22) Filed: Feb. 28, 2023

(65) Prior Publication Data

US 2024/0233189 A1     Jul. 11, 2024

Related U.S. Application Data

(60) Provisional application No. 63/479,221, filed on Jan. 10, 2023.

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01)

(58) Field of Classification Search
None
See application file for complete search history.

(56) References Cited

U.S. PATENT DOCUMENTS

2021/0005016 A1* 1/2021 Oh ........................... G06T 9/001
2021/0090301 A1* 3/2021 Mammou ................. G06T 7/11
2024/0153150 A1* 5/2024 Kim ........................ G06T 9/001

FOREIGN PATENT DOCUMENTS

WO     WO-2022023002 A1     2/2022

OTHER PUBLICATIONS

"Information Technology—Coded Representation of Immersive Media—Part 29: Video-Based Dynamic Mesh Coding (V-DMC)", MPEG Meeting; Mainz; (Motion Picture Expert Group or ISO/IEC JTC1/SC29/WG11), No. n22184, Dec. 5, 2022, Retrieved from the Internet [retrieved on Dec. 6, 2022].
Choi Yihyun et al: "Overview of the Video-based Dynamic Mesh Coding (V-DMC) Standard Work", Oct. 19, 2022, pp. 578-581, [retrieved on Nov. 25, 2022].
Danillo B Graziosi et al: "[VDMC-New] orthoAtlas: a new texture mapping proposal for V-DMC", MPEG Meeting; Oct. 24, 2022-Oct. 28, 2022; Mainz, No. m60982, Oct. 19, 2022, Retrieved from the Internet [Retrieved on Oct. 19, 2022].
(Continued)

*Primary Examiner* — Yi Wang
(74) *Attorney, Agent, or Firm* — Haverstock & Owens, A Law Corporation

(57) ABSTRACT

With the concept of sub-patches, the single geometry is described at the patch level, while the multiple attributes are then described at the sub-patch level. One application of the concept is the derivation of texture coordinates using projections for several sections of a mesh surface (affecting the attributes only), whereby the geometry of the whole mesh section uses just one single syntax element.

18 Claims, 2 Drawing Sheets

(56)          References Cited

OTHER PUBLICATIONS

Danillo Graziosi et al: "[VDMC—EE4.8 related] New high-level syntax proposal to support orthoAtlas", MPEG Meeting; Jan. 16, 2023-Jan. 20, 2023; Online, No. m61825, Jan. 17, 2023, Retrieved from the Internet [retrieved on Jan. 17, 2023].

Khaled Mammou et al: "[V-CG] Apple's Dynamic Mesh Coding CfP Response", MPEG Meeting; Apr. 25, 2022-Apr. 29, 2022; Online, No. m59281, Apr. 29, 2022, Retrieved from the Internet: [retrieved on Apr. 29, 2022].

Tourapis A et al: "Base mesh data substream format for VDMC", MPEG Meeting; Jul. 18, 2022-Jul. 22, 2022; Online; Jul. 15, 2022, Retrieved from the Internet: [retrieved on Jul. 15, 2022].

* cited by examiner

| Separating a mesh into a plurality of sub-meshes. |
|---|

200

| Transmitting the single set of geometry information and the plurality of sets of attribute information. |
|---|

202

300

302     304     306    308    320

| Network Interface | Memory | Processor | I/O | HW |
|---|---|---|---|---|
| | Bus | | | |

310

330

| Application |
|---|

Storage

312

1

V3C SYNTAX EXTENSION FOR MESH COMPRESSION USING SUB-PATCHES

CROSS-REFERENCE TO RELATED APPLICATION(S)

This application claims priority under 35 U.S.C. § 119(e) of the U.S. Provisional Patent Application Ser. No. 63/479,221, filed Jan. 10, 2023 and titled, "V3C SYNTAX EXTENSION FOR MESH COMPRESSION USING SUB-PATCHES," which is hereby incorporated by reference in its entirety for all purposes.

FIELD OF THE INVENTION

The present invention relates to three dimensional graphics. More specifically, the present invention relates to sub-patches.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

UV Atlas from Microsoft is the state-of-the-art automatic texture map generation, but requires a significant amount of time, and does optimization for a local frame only. V-PCC generates patches using orthographic projections, but targets point clouds only, so it does not address patch generation for meshes.

SUMMARY OF THE INVENTION

With the concept of sub-patches, the single geometry is described at the patch level, while the multiple attributes are then described at the sub-patch level. One application of the concept is the derivation of texture coordinates using projections for several sections of a mesh surface (affecting the attributes only), whereby the geometry of the whole mesh section uses just one single syntax element.

In one aspect, a method programmed in a non-transitory memory of a device comprises separating a mesh into a plurality of sub-meshes, wherein the plurality of sub-meshes correspond with a single set of geometry information and a plurality of sets of attribute information and transmitting the single set of geometry information and the plurality of sets of attribute information. The method further comprises encoding the mesh. The method further comprises decoding the mesh based on the single set of geometry information and the plurality of sets of attribute information. The method further comprises decoding the mesh based on orthographic projections to establish (u, v) coordinates. The method further comprises reconstructing a 3D mesh based on the (u, v) coordinates. The plurality of sets of attribute information include projection-based information. The plurality of sets of attribute information include color or texture coordinates.

In another aspect, an apparatus comprises a non-transitory memory for storing an application, the application for: separating a mesh into a plurality of sub-meshes, wherein the plurality of sub-meshes correspond with a single set of geometry information and a plurality of sets of attribute information and transmitting the single set of geometry information and the plurality of sets of attribute information and a processor coupled to the memory, the processor configured for processing the application. The application is further configured for encoding the mesh. The application is further configured for decoding the mesh based on the single set of geometry information and the plurality of sets of attribute information. The application is further configured for decoding the mesh based on orthographic projections to establish (u, v) coordinates. The application is further configured for reconstructing a 3D mesh based on the (u, v) coordinates. The plurality of sets of attribute information include projection-based information. The plurality of sets of attribute information include color or texture coordinates.

In another aspect, a system comprises an encoder configured for: separating a mesh into a plurality of sub-meshes, wherein the plurality of sub-meshes correspond with a single set of geometry information and a plurality of sets of attribute information and transmitting the single set of geometry information and the plurality of sets of attribute information and a decoder configured for: receiving the single set of geometry information and the plurality of sets of attribute information and decoding the mesh based on the single set of geometry information and the plurality of sets of attribute information. The encoder is further configured for encoding the mesh. The decoder is further configured for decoding the mesh based on orthographic projections to establish (u, v) coordinates. The decoder is further configured for reconstructing a 3D mesh based on the (u, v) coordinates. The plurality of sets of attribute information include projection-based information. The plurality of sets of attribute information include color or texture coordinates.

DETAILED DESCRIPTION OF THE PREFERRED EMBODIMENT

Figure 1:
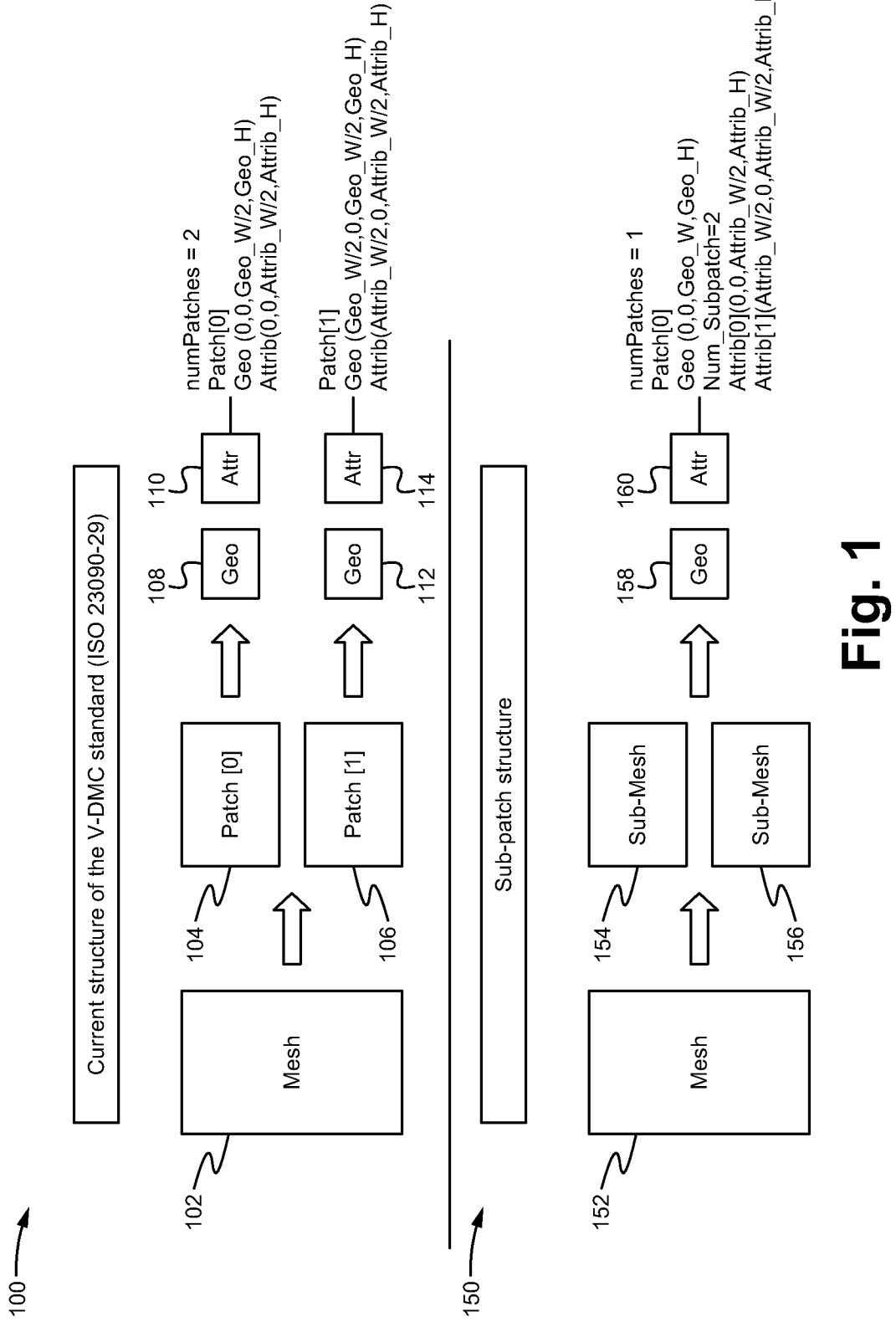
FIG. 1 illustrates a diagram of a comparison of the current structure of the V-DMC standard and a sub-patch structure described herein according to some embodiments.

Meshes are composed of a set of polygons usually describing a surface of a volume. An efficient way to describe the surface properties of a mesh (for instance, its color characteristics) is to generate a texture atlas that maps the properties of the 3D surface onto a 2D surface. The result of the mapping function is stored in (u,v) coordinates and added to the mesh data, which is then further encoded with a mesh compression approach. However, the presence of (u,v) coordinates can significantly increase the size of the compressed meshes.

In the latest international point cloud compression standard, depth map images are being generated for point clouds using orthographic projections. The parameters of the projection are then encoded in a metadata bitstream known as the atlas bitstream, so the decoder only receives those parameters and applies the mapping function to each (u,v) coordinate of the depth map to then reconstruct the 3D information.

A sub-patch extends the patch syntax from single geometry single attribute to a single geometry and multiple attributes connected to that particular geometry. Therefore, in some embodiments, the sub-patch concept could be used for the transmission of different information related to the projection of texture coordinates but defined to a single geometry.

Syntax elements are used to encode dynamic meshes using the V3C standard. A high-level syntax mechanism allows the transmission of data for attributes only by using the concept of sub-patch. Currently, the patch concept provides information for geometry and attribute dependent on each other, for instance, one patch describes a single geometry and a single attribute of a mesh surface. With the sub-patch implementation described herein, the patch syntax is able to extend the information to a single geometry and multiple attributes connected to that geometry. Therefore, the sub-patch implementation allows for the transmission of several different attribute information, for example, information related to the projection of multiple texture coordinates but associated to a single geometry.

The previous high-level syntax does not allow multiple attribute syntax information with a single geometry. With the concept of sub-patches, the single geometry is described at the patch level, while the multiple attributes are then described at the sub-patch level. One application of the concept is the derivation of texture coordinates using projections for several sections of a mesh surface (affecting the attributes only), whereby the geometry of the whole mesh section uses just one single syntax element.

New syntax elements to allow the transmission of orthoAtlas parameters to the decoder. Syntax for texture map generation using orthographic projections enables: providing the flexibility to signal a projection-based atlas parametrization method e.g., "orthoAtlas," including: description and the use of V3C syntax structures and extensions to allow the derivation of (u, v) coordinates on the decoder side rather than carrying the (u, v) coordinates in the base mesh sub-bitstream as it is currently practiced; keeping the V3C tile header syntax unchanged by assuming one-to-one correspondence between a single tile and a single sub-mesh. This makes the tile header syntax structure the same as V3C tile header syntax. Moreover, the signaling of the association between the tile and sub-meshes is performed as part of the afps extension. The flexibility also enables the use of new patch types with minimal modifications to the original V3C patch data type information. Geometry and displacement sub-bitstreams are separated and an explicit distinction is made between them. The geometry sub-bitstream is used to carry displacement information. The displacement sub-bitstream is made into a separate sub-bitstream, instead. In this way, the geometry sub-bitstream keeps semantically consistent with the current V3C geometry concept, with the potential for possible enhancement of the surface reconstruction process. A generic module for "connectivity" processing is introduced, with a "subdivision" method being one of its instances. A number of "flags" are used to provide the option to use/bypass certain V-DMC methods. A texture attribute map video is considered as a V3C attribute component video. V3C atlas tile partition information and patch information data are used and not a mesh-specific tile partition. PatchIds and facegroupIds are signaled in the mesh bitstream as association between (patchId, facegroupId) pairs allowing for a more generic and not Draco-specific method of signaling. Sub-patches are generated to transmit projection-based information (for instance, syntax elements such as position and size of patches in 2D space) for attributes related to a single geometry, defined at the patch level.

FIG. 1 illustrates a diagram of a comparison of the current structure of the V-DMC standard and a sub-patch structure described herein according to some embodiments. The current structure of the V-DMC standard 100 includes a mesh 102 which is able to be divided into patches (patch[0] 104 and patch[1] 106). Patch[0] includes geometry information 108 and attribute information 110. Patch[1] includes geometry information 112 and attribute information 114.

The Sub-patch structure 150 (also referred to as a sub-mesh) as described herein includes a mesh 152 which is able to be split into a first sub-mesh 154 and a second sub-mesh 156 with shared geometry information 158 and attribute information 160 for each sub-mesh. Unlike the current structure of the V-DMC standard 100, the sub-patch structure 150 is able to utilize the same geometry information for multiple sub-patches instead of separate geometry information for each sub-patch. In some embodiments, in the sub-patch structure 150, a single patch is utilized with geometry information and multiple sets of attribute information.

With the new syntax element (sub-patch), a single geometry is described at the patch level, while multiple attributes are then described at the sub-patch level. One application of the concept is the derivation of texture coordinates using projections for several sections of a mesh surface (affecting the attributes only), whereby the geometry of the whole mesh section uses just one single syntax element.

In meshes, the texture coordinate maps a 3D position to a 2D position on an atlas, so that the color can be patched for reconstruction. In meshes, there is a structure to send texture coordinates. With the orthoAtlas approach, the gengeometry. For the attributes, there are able to be multiple attributes. Each group of triangles may be better suited for a different type of projection. In that case, there are multiple attributes and multiple projections for a single geometry. The patch is a single geometry, but inside the patch there are sub-patches that are related to the attributes.

An exemplary ASPS VMC Extension syntax is described.

| | Descriptor |
|---|---|
| asps_vmc_extension( ) { | |
|     asps_vmc_ext_prevent_geometry_video_conversion_flag | u(1) |
|     asps_vmc_ext_prevent_attribute_video_conversion_flag | u(1) |
|     asps_vmc_ext_subdivision_method | u(3) |
|     asps_vmc_ext_subdivision_iteration_count | u(8) |
|     asps_vmc_ext_displacement_coordinate_system | u(1) |
|     asps_vmc_ext_transform_index | u(3) |
|     if(asps_vmc_ext_transform index == LINEAR_LIFTING) { | |
|         vmc_lifting_transform_parameters( 0, 0 ) | |
|     } | |
|     asps_vmc_ext_patch_mapping_method | ue(v) |
|     asps_vmc_ext_tjunction_removing_method | ue(v) |
|     asps_vmc_ext_num_attribute | ue(v) |
|     asps_vmc_ext_num_attribute_video | u(7) |
|     for(i=0; i< asps_vmc_ext_num_attribute; i++) | |
|         asps_vmc_ext_attribute_bitdetph_minus1[ i ] | u(8) |
|     NumAspsNonVideoAttribute =asps_vmc_ext_num_attribute – | |
| asps_vmc_ext_num_attribute_video | |
|     for(i=0; i< NumAspsNonVideoAttribute i++) | |
|         asps_vmc_ext_attribute_type[ i ] | u(8) |
|     for(i=0; i< asps_vmc_ext_num_attribute_video; i++){ | |
|         asps_vmc_ext_attribute_video_type[ i ] | u(8) |
|         asps_vmc_ext_attribute_frame_width[ i ] | ue(v) |
|         asps_vmc_ext_attribute_frame_height[ i ] | ue(v) |
|         asps_vmc_vmc_ext_attribute_transform_index[ i ] | u(3) |
|         if(asps_vmc_ext_attribute_transform_index == | |
| LINEAR_LIFTING ) { | |
|             asps_vmc_extension_transform_ | |
| parameters_present_flag[ i ] | u(1) |
|             if(asps_vmc_extension_transform_ | |
| parameters_present_flag) | |
|                 vmc_lifting_transform_ | |
| parameters(i+1, 0) | |
|         } | |
|         asps_vmc_ext_direct_attribute_projection_ | |
| enabled_flag[ i ] | u(1) |
|     } | |
|     asps_vmc_ext_derive_textcoord_from_pos_flag | u(1) |
|     if(asps_vmc_ext_derive_textcoord_from_pos_flag) { | |
|         asps_vmc_extension_orthoAtlas_gutter | u(32) |
|         asps_vmc_extension_orthoAtlas_occupancy_resolution | u(16) |
|         asps_vmc_extension_orthoAtlas_patch_scale_factor | u(32) |
|     } | |
| } | | eration of the u, v coordinates is performed using projection, which means the texture coordinates are not sent inside the mesh. Instead, metadata information is able to be sent. Then, at the decoder side, the texture coordinate information is able to be generated.

In a mesh, there is a patch that defines an area of the mesh. The area is divided into triangles. Some triangles are able to be grouped to use the same projection metadata. The projection metadata for the groups of triangles are the sub-patches, and the projection metadata is only sent for those groups of triangles. Then, on the decoder side, the texture mapping is able to be re-generated based on the projection metadata.

A patch is defined as a set of triangles on the surface of the mesh. All of the triangles are linked to a single geometry. Some triangles are able to have different projection parameters that affect attributes such as color or texture coordinates of the mesh. In that case, the geometry is a single MeshPatchDataUnit:

```
std::vector<uint16_t> mdu_mesh_sub_patch_count_;
std::vector< MeshSubPatchDataUnit>
mdu_mesh_sub_patches_data_units_;
  class MeshSubPatchDataUnit {
    std::vector<uint32_t> mspdu_attributes_2d_pos_x_;
    std::vector<uint32_t> mspdu_attributes_2d_pos_y_;
    std::vector<uint32_t> mspdu_attributes_2d_size_x_minus1_;
    std::vector<uint32_t> mspdu_attributes_2d_size_y_minus1_;
    std::vector<uint32_t> mspdu_projection_id_;
    std::vector<uint32_t> mspdu_orientation_index_;
    std::vector<float>  mspdu_attribute_patch_scale_;
    std::vector<float>  mspdu_attribute_frame_scale_;
}
```

The sub-patch concept has been introduced for the attribute videos, since they, unlike V-PCC, may have different number of patches with the geometry. A new syntax element has been added whereas it signals number of sub-patches associated with each attribute video signal (mdu_mesh_sub_patch_count_). In addition, a direct attribute projection flag is used to indicate projection based orthoAtlas texture video. In this implementation subMeshPDU syntax element (mdu_mesh_sub_patches_data_units_) is resized according to the number of sub-patches and are used to read the parameters associated with orthoAtlas based generated patches.

Mesh Intra Patch Data Unit

|  | Descriptor |
|---|---|
| mesh_intra_data_unit( tileID, patchIdx ) { |  |
| mdu_submesh_id[ tileID ][ patchIdx ] | u(v) |
| mdu_vertex_count_minus1[ tileID ][ patchIdx ] | ue(v) |
| mdu_triangle_count_minus1[ tileID ][ patchIdx ] | ue(v) |
| if(asps_vmc_ext_patch_mapping_method != 0){ |  |
| mdu_subpart_count_minus1 [ tileID ][ patchIdx ] | ue(v) |
| for(i=0;i< mdu_subpart_count_ |  |
| minus1[ tileID ][ patchIdx ]; i++) |  |
| mdu_subpart_id[ tileID ][ patchIdx ][ i ] | ue(v) |
| } |  |
| mdu_geometry_2d_pos_x[ tileID ][ patchIdx ] | ue(v) |
| mdu_geometry_2d_pos_y[ tileID ][ patchIdx ] | ue(v) |
| mdu_geometry_2d_size_x_minus1[ tileID ][ patchIdx ] | ue(v) |
| mdu_geometry_2d_size_y_minus1[ tileID ][ patchIdx ] | ue(v) |
| if(afps_vmc_ext_3d_offset_enable_flag) { |  |
| mdu_3d_offset_u[ tileID ][ patchIdx ] | ue(v) |
| mdu_3d_offset_v[ tileID ][ patchIdx ] | ue(v) |
| mdu_3d_offset_d[ tileID ][ patchIdx ] | ue(v) |
| } |  |
| if( asps_normal_axis_max_delta_value_enabled_flag ) |  |
| mdu_3d_range_d[ tileID ][ patchIdx ] | ue(v) |
| if( afps_lod_mode_enabled_flag ) { |  |
| mdu_lod_enabled_flag[ tileID ][ patchIdx ] | u(1) |
| if( mdu_lod_enabled_flag[ tileID ][ patchIdx ] > 0 ) { |  |
| mdu_lod_scale_x_minus1[ tileID ][ patchIdx ] | ue(v) |
| mdu_lod_scale_y_idc[ tileID ][ patchIdx ] | ue(v) |
| } |  |
| } |  |
| mdu_patch_parameters_enable_flag[ tileID ][patchIdx ] | u(1) |
| if(mdu_patch_parameters_enable_flag){ |  |
| mdu_subdivision_enable_flag[ tileID ][ patchIdx ] | u(1) |
| mdu_displacement_coordinate_system_enable_ |  |
| flag[ tileID ][ patchIdx ] | u(1) |
| mdu_transform_index_enable_flag[ tileID ][ patchIdx ] | u(1) |
| mdu_transform_parameters_enable_flag[ tileID ][ patchIdx ] | u(1) |
| mdu_attribute_parameter_overwrite_flag[ tileID ][ patchIdx ] | u(1) |
| } |  |
| if(mdu_subdivision_enable_flag[ tileID ][ patchIdx ]){ |  |
| mdu_subdivision_method[ tileID ][ patchIdx ] | u(3) |
| mdu_subdivision_iteration_count[ tileID ][ patchIdx ] | u(8) |
| } |  |
| if(mdu_displacement_coordinate_system_enable_flag[ tileID ][ patchIdx ]) |  |
| mdu_displacement_coordinate_system[ tileID ][ patchIdx ] | u(1) |
| if(mdu_transform_index_enable_flag[ tileID ][ patchIdx ]) |  |
| mdu_transform_index[ tileID ][ patchIdx ] | u(3) |
| if(mdu_transform_index[ tileID ][ patchIdx ] == LINEAR_LIFTING && |  |
| mdu_transform_parameters_enable_flag[ tileID ][ patchIdx ]) |  |
| vmc_lifting_transform_parameters(0, 2) |  |
| if(mdu_attribute_parameter_overwrite_flag[ tileID ][ patchIdx ]){ |  |
| for(i=0; i< asps_vmc_ext_num_attribute_video; i++){ |  |
| mdu_vmc_ext_direct_attribute_projection_enabled_flag[ tileID ][ |  |
| patchIdx ][ i ] | u(1) |
| if(mdu_vmc_ext_direct_attribute_projection_enabled_flag[ tileID ][ |  |
| patchIdx ][ i ]){ |  |
| mdu_attributes_frame_scale[ tileID ][ patchIdx ][ i ] | u(32) |
| mdu_attributes_mesh_sub_patch_ |  |
| count[ tileID ][ patchIdx ][ i ] | u(16) |
| for(j=0; j< mdu_attributes_mesh_sub_patch_count[ tileID ][ |  |
| patchIdx ][ i ]; j++) |  |
| mesh_sub_patch_data_unit(tileID, patchIdx, i, j) |  |
| if(mdu_attribute_parameter_overwrite_flag[ tileID ][ patchIdx ]){ |  |
| mdu_attribute_transform_index_enable_ |  |
| flag[ tileID ][ patchIdx ][ i ] | u(1) |
| mdu_attribute_transform_parameters_enable_ |  |
| flag[ tileID ][ patchIdx ][ i ] | u(1) |
| if(mdu_attribute_transform_index_enable_ |  |
| flag[ tileID ][ patchIdx ][ i ]) |  |
| mdu_attribute_transform_ |  |

-continued

| | Descriptor |
|---|---|
| index[ tileID ][ patchIdx ][ i ] | u(3) |
|        if(mdu__attribute__transform__index[ tileID ][ patchIdx ] == | |
| LINEAR__LIFTING && mdu__attribute__transform__parameters __ | |
| enable__flag[ tileID ][ patchIdx ]) | |
|           vmc__lifting__transform__parameters(i+1, 2) | |
|       } | |
|   } | |
| } | |

Mesh Sub-Patch Data Unit

| | Descriptor |
|---|---|
| mesh__sub__patch__data__unit( tileID, patchIdx, attrIdx, subPatchIdx ) { | |
|    mdu__attributes__2d__pos__x[ tileID ][ patchIdx ][ attrIdx ][ subPatchIdx ] | ue(v) |
|    mdu__attributes__2d__pos__y[ tileID ][ patchIdx ] [ attrIdx ][ subPatchIdx ] | ue(v) |
|      mdu__attributes__2d__size__x__minus1[ tileID ] [ attrIdx ][ subPatchIdx ] | ue(v) |
|      mdu__attributes__2d__size__y__minus1[ tileID ] [ attrIdx ][ subPatchIdx ] | ue(v) |
|      mdu__projection__id[ tileID ][ patchIdx ] [ attrIdx ][ subPatchIdx ] | ue(v) |
|      mdu__orientation__id[ tileID ][ patchIdx ] [ attrIdx ][ subPatchIdx ] | ue(v) |
|      mdu__patch__scale__present__flag[ tileID ] [ attrIdx ][ subPatchIdx ] | u(1) |
|      if(mdu__patch__scale__present__flag[ tileID ] [ attrIdx ][ subPatchIdx ]){ | |
|        mdu__patch__scale__factor__ | |
| ratio[ tileID ][ patchIdx ] [ attrIdx ][ subPatchIdx ] | u(8) |

New Extensions and Redesign

Although an I-MESH mesh patch data unit is described herein, a similar implementation is able to be performed with a P-MESH mesh patch data unit. The association between 3D positions and uv texture coordinates is signaled using faceGroupId which is carried in a submesh sub-bitstream. Atlas data unit-based signaling is also able to be utilized.

A new syntax element is able to be added to inter/intra patch data units to signal number of sub-patches associated with the attribute video data and vector of newly introduced mesh sub-patch data unit, sized according to the number of attribute video types, for both inter and intra, to support video attributes with different number of patches with geometry.

Figures 2, 3:
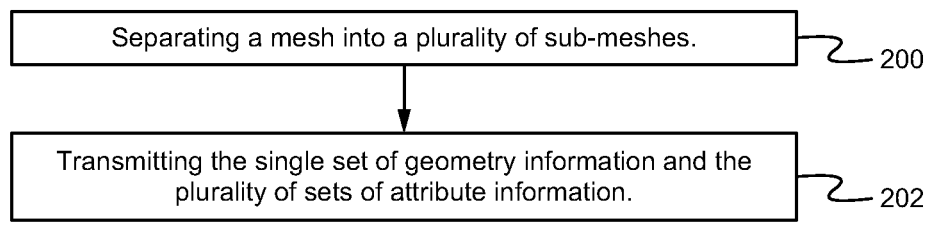
FIG. 2 illustrates a flowchart of a method of mesh compression using sub-patches according to some embodiments.
FIG. 3 illustrates a block diagram of an exemplary computing device configured to implement the sub-patch method according to some embodiments.

FIG. 2 illustrates a flowchart of a method of mesh compression using sub-patches according to some embodiments. In the step 200, a mesh is separated into a plurality of sub-meshes. The plurality of sub-meshes correspond with a single set of geometry information and a plurality of sets of attribute information. In the step 202, the single set of geometry information and the plurality of sets of attribute information are transmitted (e.g., from an encoder to a decoder). In some embodiments, fewer or additional steps are implemented. For example, the mesh is encoded (e.g., by an encoder). In another example, the mesh is decoded (e.g., by a decoder) based on the single set of geometry information and the plurality of sets of attribute information. In yet another example, the mesh is decoded based on orthographic projections to establish (u, v) coordinates. In another example, a 3D mesh is reconstructed based on the (u, v) coordinates. In some embodiments, a coder/decoder (codec) is able to be implemented to encode and decode the mesh/information. In some embodiments, the order of the steps is modified.

FIG. 3 illustrates a block diagram of an exemplary computing device configured to implement the sub-patch method according to some embodiments. The computing device 300 is able to be used to acquire, store, compute, process, communicate and/or display information such as images and videos including 3D content. The computing device 300 is able to implement any of the encoding/decoding aspects. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, High Definition disc/drive, ultra-HD drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Sub-patch application(s) 330 used to implement the sub-patch implementation are likely to be stored in the storage device 312 and memory 304 and processed as applications are typically processed. More or fewer components shown in FIG. 3 are able to be included in the computing device 300. In some embodiments, sub-patch hardware 320 is included. Although the computing device 300 in FIG. 3 includes applications 330 and hardware 320 for the sub-patch implementation, the sub-patch method is able to be implemented on a computing device in hardware, firmware, software or any combination thereof. For example, in some embodiments, the sub-patch applications 330 are programmed in a memory and executed using a processor. In another example, in some embodiments, the sub-patch hardware 320 is programmed hardware logic including gates specifically designed to implement the sub-patch method.

In some embodiments, the sub-patch application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the sub-patch method, a device acquires or receives 3D content (e.g., point cloud content). The sub-patch method is able to be implemented with user assistance or automatically without user involvement.

In operation, a sub-patch is able to be used to transmit multiple syntax elements for attributes inside one patch with one single geometry. The sub-patch concept has been successfully used for the orthoAtlas proposal to transmit patch information and derive the texture coordinates at the decoder side, integrating with previously proposed high-level syntax being currently evaluated in EE4.11.

Some Embodiments of V3C Syntax Extension for Mesh Compression Using Sub-Patches

1. A method programmed in a non-transitory memory of a device comprising:
    separating a mesh into a plurality of sub-meshes, wherein the plurality of sub-meshes correspond with a single set of geometry information and a plurality of sets of attribute information; and
    transmitting the single set of geometry information and the plurality of sets of attribute information.
2. The method of clause 1 further comprising encoding the mesh.
3. The method of clause 1 further comprising decoding the mesh based on the single set of geometry information and the plurality of sets of attribute information.
4. The method of clause 1 further comprising decoding the mesh based on orthographic projections to establish (u, v) coordinates.
5. The method of clause 3 further comprising reconstructing a 3D mesh based on the (u, v) coordinates.
6. The method of clause 1 wherein the plurality of sets of attribute information include projection-based information.
7. The method of clause 1 wherein the plurality of sets of attribute information include color or texture coordinates.
8. An apparatus comprising:
    a non-transitory memory for storing an application, the application for:
        separating a mesh into a plurality of sub-meshes, wherein the plurality of sub-meshes correspond with a single set of geometry information and a plurality of sets of attribute information; and
        transmitting the single set of geometry information and the plurality of sets of attribute information; and
    a processor coupled to the memory, the processor configured for processing the application.
9. The apparatus of clause 8 wherein the application is further configured for encoding the mesh.
10. The apparatus of clause 8 wherein the application is further configured for decoding the mesh based on the single set of geometry information and the plurality of sets of attribute information.
11. The apparatus of clause 8 wherein the application is further configured for decoding the mesh based on orthographic projections to establish (u, v) coordinates.
12. The apparatus of clause 11 wherein the application is further configured for reconstructing a 3D mesh based on the (u, v) coordinates.
13. The apparatus of clause 8 wherein the plurality of sets of attribute information include projection-based information.
14. The apparatus of clause 8 wherein the plurality of sets of attribute information include color or texture coordinates.
15. A system comprising:
    an encoder configured for:
        separating a mesh into a plurality of sub-meshes, wherein the plurality of sub-meshes correspond with a single set of geometry information and a plurality of sets of attribute information; and
        transmitting the single set of geometry information and the plurality of sets of attribute information; and
    a decoder configured for:
        receiving the single set of geometry information and the plurality of sets of attribute information; and
        decoding the mesh based on the single set of geometry information and the plurality of sets of attribute information.
16. The system of clause 15 wherein the encoder is further configured for encoding the mesh.
17. The system of clause 15 wherein the decoder is further configured for decoding the mesh based on orthographic projections to establish (u, v) coordinates.
18. The system of clause 17 wherein the decoder is further configured for reconstructing a 3D mesh based on the (u, v) coordinates.
19. The system of clause 15 wherein the plurality of sets of attribute information include projection-based information.
20. The system of clause 15 wherein the plurality of sets of attribute information include color or texture coordinates.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
    separating a mesh into a plurality of sub-meshes, wherein the plurality of sub-meshes correspond with a single set of geometry information and a plurality of sets of attribute information, wherein the single set of geometry information is shared by the plurality of sub-meshes;
    signaling a number of sub-patches associated with the plurality of sets of attribute information;
    transmitting the single set of geometry information and the plurality of sets of attribute information;

receiving the single set of geometry information and the plurality of sets of attribute information; and decoding the mesh based on the single set of geometry information and the plurality of sets of attribute information, including derivation of texture coordinates using projections for a plurality of sections of a mesh surface affecting only the plurality of sets of attribute information, wherein geometry of the mesh uses a single syntax element.

2. The method of claim 1 further comprising encoding the mesh.

3. The method of claim 1 further comprising decoding the mesh based on orthographic projections to establish (u, v) coordinates.

4. The method of claim 3 further comprising reconstructing a 3D mesh based on the (u, v) coordinates.

5. The method of claim 1 wherein the plurality of sets of attribute information include projection-based information.

6. The method of claim 1 wherein the plurality of sets of attribute information include color or texture coordinates.

7. An apparatus comprising:

a non-transitory memory for storing an application, the application for:

separating a mesh into a plurality of sub-meshes, wherein the plurality of sub-meshes correspond with a single set of geometry information and a plurality of sets of attribute information, wherein the single set of geometry information is shared by the plurality of sub-meshes;

signaling a number of sub-patches associated with the plurality of sets of attribute information;

transmitting the single set of geometry information and the plurality of sets of attribute information;

receiving the single set of geometry information and the plurality of sets of attribute information; and decoding the mesh based on the single set of geometry information and the plurality of sets of attribute information, including derivation of texture coordinates using projections for a plurality of sections of a mesh surface affecting only the plurality of sets of attribute information, wherein geometry of the mesh uses a single syntax element; and a processor coupled to the memory, the processor configured for processing the application.

8. The apparatus of claim 7 wherein the application is further configured for encoding the mesh.

9. The apparatus of claim 7 wherein the application is further configured for decoding the mesh based on orthographic projections to establish (u, v) coordinates.

10. The apparatus of claim 9 wherein the application is further configured for reconstructing a 3D mesh based on the (u, v) coordinates.

11. The apparatus of claim 7 wherein the plurality of sets of attribute information include projection-based information.

12. The apparatus of claim 7 wherein the plurality of sets of attribute information include color or texture coordinates.

13. A system comprising:

an encoder configured for:

separating a mesh into a plurality of sub-meshes, wherein the plurality of sub-meshes correspond with a single set of geometry information and a plurality of sets of attribute information, wherein the single set of geometry information is shared by the plurality of sub-meshes;

signaling a number of sub-patches associated with the plurality of sets of attribute information; and transmitting the single set of geometry information described at a mesh-level and the plurality of sets of attribute information described at a sub-mesh-level; and a decoder configured for:

receiving the single set of geometry information and the plurality of sets of attribute information; and decoding the mesh based on the single set of geometry information and the plurality of sets of attribute information, including derivation of texture coordinates using projections for a plurality of sections of a mesh surface affecting only the plurality of sets of attribute information, wherein geometry of the mesh uses a single syntax element.

14. The system of claim 13 wherein the encoder is further configured for encoding the mesh.

15. The system of claim 13 wherein the decoder is further configured for decoding the mesh based on orthographic projections to establish (u, v) coordinates.

16. The system of claim 15 wherein the decoder is further configured for reconstructing a 3D mesh based on the (u, v) coordinates.

17. The system of claim 13 wherein the plurality of sets of attribute information include projection-based information.

18. The system of claim 13 wherein the plurality of sets of attribute information include color or texture coordinates.

* * * * *